G. T. MACFARLANE.
WINCH.
APPLICATION FILED MAR. 25, 1918.
1,345,613.
Patented July 6, 1920.
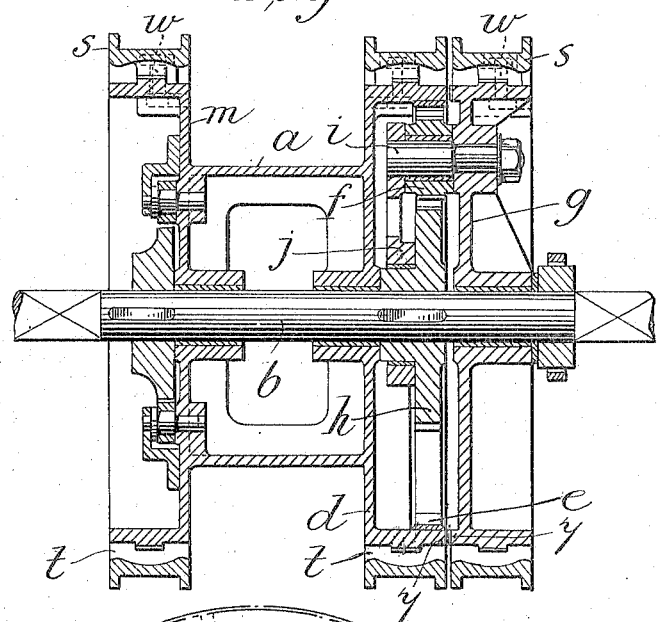
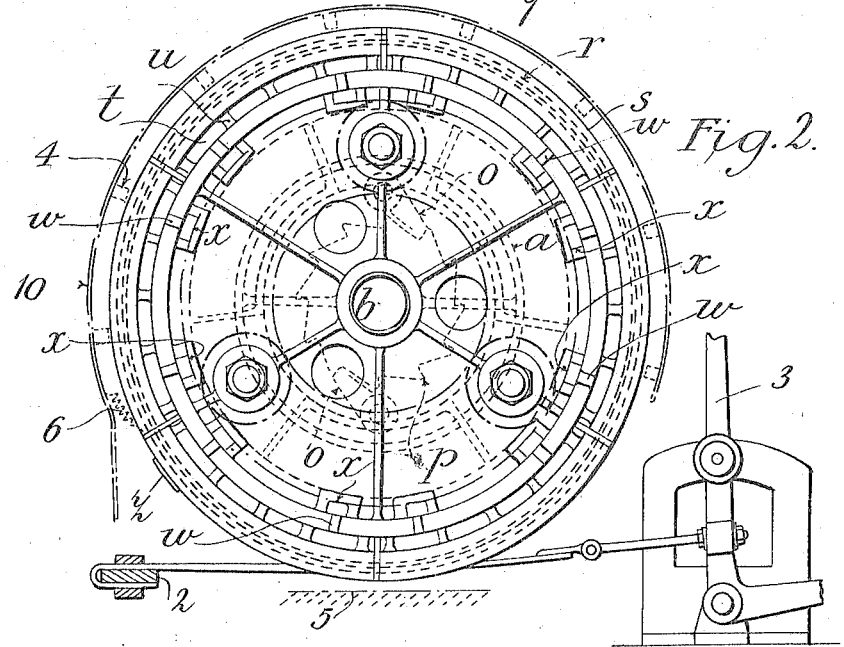
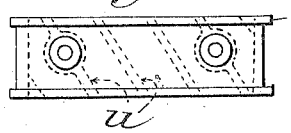

UNITED STATES PATENT OFFICE.

GEORGE THOMAS MACFARLANE, OF PINNER, ENGLAND.

WINCH.

1,345,613.   Specification of Letters Patent.   Patented July 6, 1920.

Original application filed May 22, 1917, Serial No. 170,123. Divided and this application filed March 25, 1918. Serial No. 224,555.

*To all whom it may concern:*

Be it known that I, GEORGE THOMAS MACFARLANE, a subject of the King of Great Britain and Ireland, residing at Pinner, in the county of Middlesex, England, have invented Improvements in Winches, of which the following is a specification.

This invention relates to winches such as illustrated and described in my application Serial No. 170,123, filed May 22, 1917, of which this application is a division, and has for its object to provide a winch particularly suitable for use as a ship's winch for handling cargo quickly and without undue shock, "overhauling" of the winch barrel being effected rapidly and detrimental heating and wear of the brake devices being avoided.

In a winch according to the invention, the barrel, or each barrel, is rotated from the driving shaft through epicyclic gear controlled by brake drums furnished with band brakes that are fitted with brake blocks or with a bearing surface of compressed fiber or other suitable material. Means are provided as by fixed studs or the like arranged around and at a suitable distance from the periphery of the brake band to prevent or minimize contact between the brake bands and the drum when not required.

The speed at which loads are lowered and "overhauling" effected in the handling of ship's cargo tends to produce detrimental heating and wear of the brake devices as is well known and in order to obviate this disadvantage and consequently to increase the life and efficiency of the winch the brake drums thereof are cooled by currents of air produced by the provision of inclined vanes in annular or other shaped passages formed near the periphery of each brake drum, the said vanes acting as fan blades, and inducing a flow of air in proximity to the brake bearing surfaces during the rotation of the said drum.

As the barrels of a multi-barrel winch embodying the invention are all similar it is sufficient to describe the invention in connection with one barrel only.

In the accompanying drawings, Figure 1 shows in central vertical section a winch barrel embodying the invention.

Fig. 2 is an end view of the winch barrel and

Fig. 3 shows in plan a removable section of the brake rim.

The barrel $a$ is freely mounted on the driving shaft $b$ and is driven in a hoisting direction through epicyclic gear comprising a brake drum $d$ provided internally with a ring of teeth $e$ engaged by planet pinions $f$ secured to another adjacent brake drum $g$, it being understood that the barrel $a$ is attached to the internally toothed drum $d$ and that the driving shaft $b$ has a sun wheel $h$ engaging the planet pinions. The inner ends of the planet pinion spindles $i$ are carried in a disk $j$ mounted to rotate on the boss of the sun wheel $h$. The end of the barrel remote from the epicyclic gear drums is formed in one with or is fixed to another drum $m$ that is also provided with a band brake and that has pivoted to it pawls $o$ adapted to engage a ratchet wheel $p$ fixed to the driving shaft $b$ of the winch. The arrangement is such that, during hoisting, when the barrel $a$ and driving shaft $b$ rotate in opposite directions, the pawls $o$ will slip idly over the ratchet wheel $p$, but during lowering, when the barrel $a$ and driving shaft $b$ rotate in the same direction, the pawls $o$ will engage the teeth of the ratchet wheel $p$ upon the rate of rotation of the drum $a$ overtaking that of the driving shaft $b$, the engine, which in the case of an electric winch may be a shunt-wound motor, then acting as a brake. By these means the work usually taken by the ordinary brakes is or can be reduced with corresponding prevention of overheating.

The brake bands $r$ are all fitted with wearing blocks preferably shod with compressed fiber and to prevent undue heating the brake rim $s$ of each drum is made separate from the drum proper and between it and the drum is an annular space or passage $t$ in which are vanes or blades $u$ that extend in an inclined direction across the width of the drum.

The separate rim $s$ is made in removable parts, as shown, so as to be readily renewable without having to remove the drums proper and so that the brake bands $r$ can be put in position without straining them by having to expand them in order to clear flanges for which purpose the said bands are constructed in halves and afterward butted and joined at the top. Each part of the rim *s* is secured in place on the drum by bolts *w* the heads of which engage open ended T-shaped slots *x* in the drum *a* and the nuts of which are sunk in recesses formed therefor in the parts of the rim *s*.

Each brake band *r* comprises metal strips connected together at *z*, as regards the band *r* shown in Fig. 2, one or more of the strips extending from the point of connection around the drum to the point of anchorage 2, and the other or others in like manner extending around the drum to the operating device 3. To insure uniform gripping and release of the band *r* fixed stops 4 are provided at intervals about the diameter of the drum as indicated in dot and dash lines in Fig. 2. These stops successively limit the outward expansion of the band *r* as the brake is released or moved into its off position and consequently cause such band to quickly and practically simultaneously clear the drum throughout its diameter. At the point where the band ends are led away from the drum to the point of anchorage and the operating mechanism a stop or abutment 5 is also provided for the same purpose. 6, Fig. 2, indicates a spring of which there may be several that tends to pull the band away from the brake drum to facilitate quick release of the brake.

Annular faces 7 on the adjacent faces of the brake drums *d* and *g* are adapted to be brought into frictional engagement by sliding the drum *g* toward the drum *d*. When so engaged with each other, the two drums will revolve together if the brake bands of both drums be released, the drum *d*, which normally rotates in a direction opposite to that of the shaft *b* when the drum *g* is stationary, being then driven in the reverse direction.

In the example illustrated the stops 4 and spring or springs 6, are carried by a fixed structure 10 that constitutes a shield for the brake drums.

As will be understood details of construction of the improved winch may be varied without departure from the invention.

What I claim is:—

1. In a winch, a brake drum formed with T-shaped slots near the periphery thereof, a brake rim built up of renewable sections on said drum, bolts the heads of which engage the T-shaped slots of said brake drum for fixing said rim sections on said drum, and vanes between the periphery of said brake drum and said rim.

2. In a winch, a brake drum formed with T-shaped slots near the periphery thereof, a brake rim of channel cross section built up of renewable sections on said drum, bolts the heads of which engage the T-shaped slots of said brake drum for fixing said rim sections on said drum, a brake band constructed in sections whereby it can be applied to said brake rim without straining said brake band and vanes between the periphery of said brake drum and said rim.

3. In a winch, a brake drum formed with T-shaped slots near the periphery thereof, a brake rim of channel cross section built up of renewable sections on said drum, bolts the heads of which engage the T-shaped slots of said brake drum for fixing said rim sections on said drum, a brake band constructed in two sections whereby it can be applied to said brake rim without straining said brake band and vanes between the periphery of said brake drum and said rim.

4. In a winch, a driven shaft, a barrel freely mounted on said shaft, epicyclic gear driven from said shaft and adapted to rotate said barrel in the opposite direction to that of said shaft, a brake drum controlling said epicyclic gear, a brake drum fixed to said barrel, each of said brake drums having a brake rim made in parts from which extend inwardly ribs that rest on the peripheries of said brake drums and form air cooling passages, a ratchet wheel fixed on said shaft, a ratchet pawl on said barrel adapted to engage said ratchet wheel when said barrel rotates relatively to the said shaft in the same direction as that of the said shaft, a brake band on each of said drums, and fixed stops for said brake band arranged at regular intervals around said brake drums.

Signed at Kingdom of Great Britain and Ireland, city of London, England, United States consulate general, this twenty-eighth day of February, 1918.

GEORGE THOMAS MACFARLANE.